United States Patent [19]

Moeglich

[11] 4,072,596
[45] Feb. 7, 1978

[54] APPARATUS FOR REMOVAL OF CONTAMINANTS FROM WATER

[75] Inventor: Karl Moeglich, Williamsville, N.Y.

[73] Assignee: Westinghouse Electric Corporation, Pittsburgh, Pa.

[21] Appl. No.: 663,791

[22] Filed: Mar. 4, 1976

Related U.S. Application Data

[63] Continuation-in-part of Ser. No. 573,577, April 30, 1975.

[51] Int. Cl.$^2$ ............................. C02B 1/82; C25B 3/02
[52] U.S. Cl. .................................. 204/241; 204/1 R; 204/149; 204/269
[58] Field of Search ....... 204/130, 131, 1 R, DIG. 10, 204/72, 152, 267, 268, 269, 270, 149, 151, 241

[56] References Cited

U.S. PATENT DOCUMENTS

| | | | |
|---|---|---|---|
| 3,457,152 | 7/1969 | Maloney, Jr. et al. | 204/131 |
| 3,616,356 | 10/1971 | Roy | 204/152 |
| 3,692,661 | 9/1972 | Shockor | 204/269 |
| 3,716,459 | 2/1973 | Salter et al. | 204/1 R |
| 3,719,570 | 3/1973 | Lancy | 204/151 |
| 3,730,864 | 5/1973 | Tarjanyi et al. | 204/149 |
| 3,761,383 | 9/1973 | Backhurst et al. | 204/268 |
| 3,764,499 | 10/1973 | Okubo et al. | 204/151 |
| 3,766,034 | 10/1973 | Veltman | 204/149 |

Primary Examiner—Arthur C. Prescott
Attorney, Agent, or Firm—LeBlanc & Shur

[57] ABSTRACT

A vessel is described for facilitating the removal of difficultly oxidizable impurities such as phenol and/or polychlorinated biphenyl from dilute aqueous solutions or dispersions. The vessel contains stacked, packed beds having characteristics of alternating high and low electrical conductivity with separately controlled pairs of electrodes for the two alternate types of beds. An aqueous solution containing contaminants is admitted to the vessel and passed through the successive beds wherein the solution or dispersion is subjected to an alternating current field for decomposition of the contaminants in the high resistivity beds and oxidization thereof in the lower resistivity beds by hydrogen peroxide produced by alternating current electrolysis of water. The preferred electrodes are hollow and water cooled. In addition, the bed is jacketed and cooling water is circulated through the jacket to maintain a more efficient, lower process temperature. The bed having lower resistivity includes conductive particles which may be graphite, and may include activated carbon or equivalent material. Said bed also contains non-conductive particles such particles being coated with catalysts. The catalyst may be an oxidation catalyst, such as the oxides of the metals of Groups IVa, Va, VIb, and VIIb, and specifically preferred are $MnO_2$, $Cr_2O_3$, $Bi_2O_3$ or $PbO_2$. In the alternative, the catalyst may be a reduction catalyst such as oxides of nickel, iron and oxides of other Group VIII metals. The highly resistive bed is packed with said non-conductive particles only.

23 Claims, 8 Drawing Figures

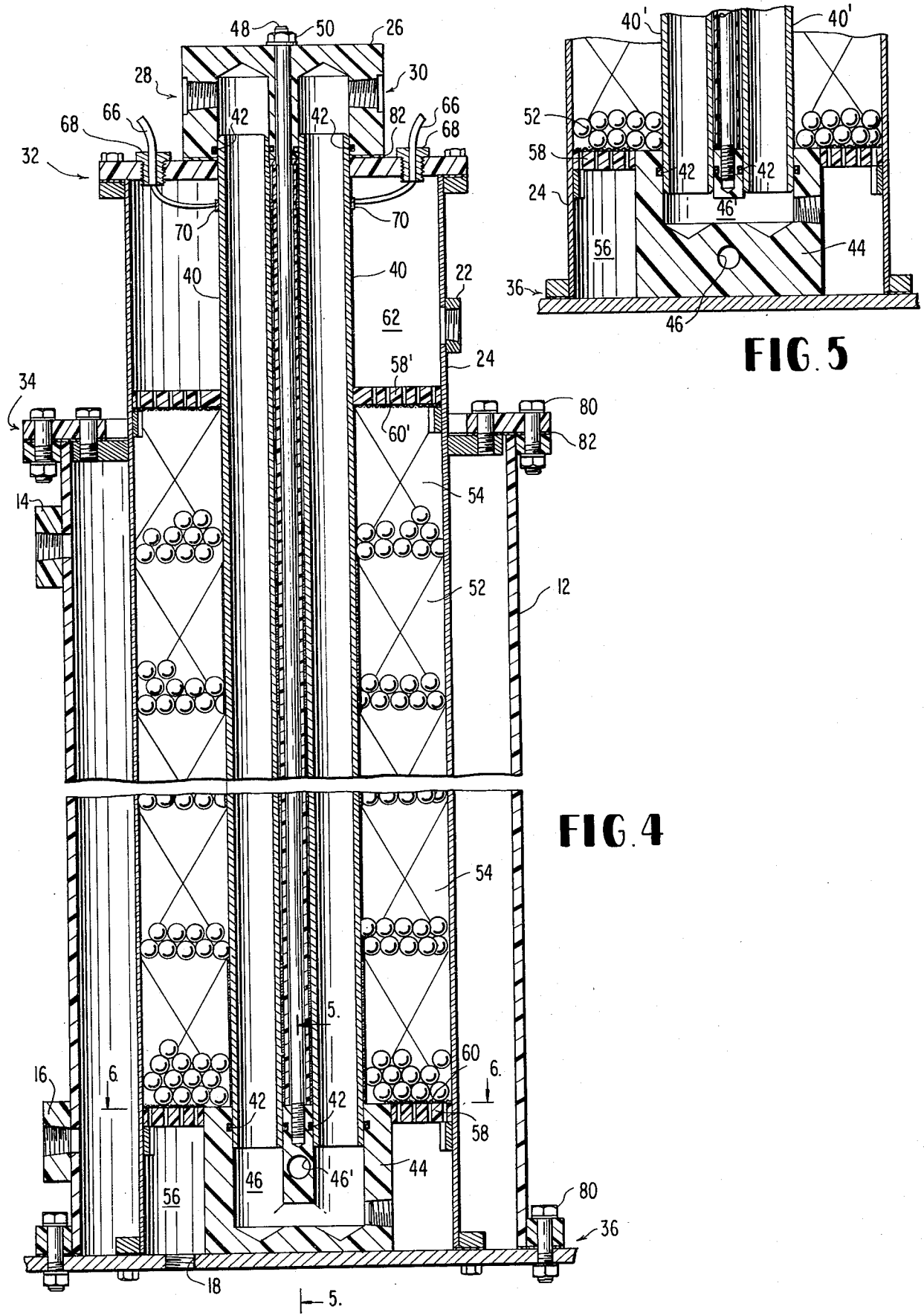

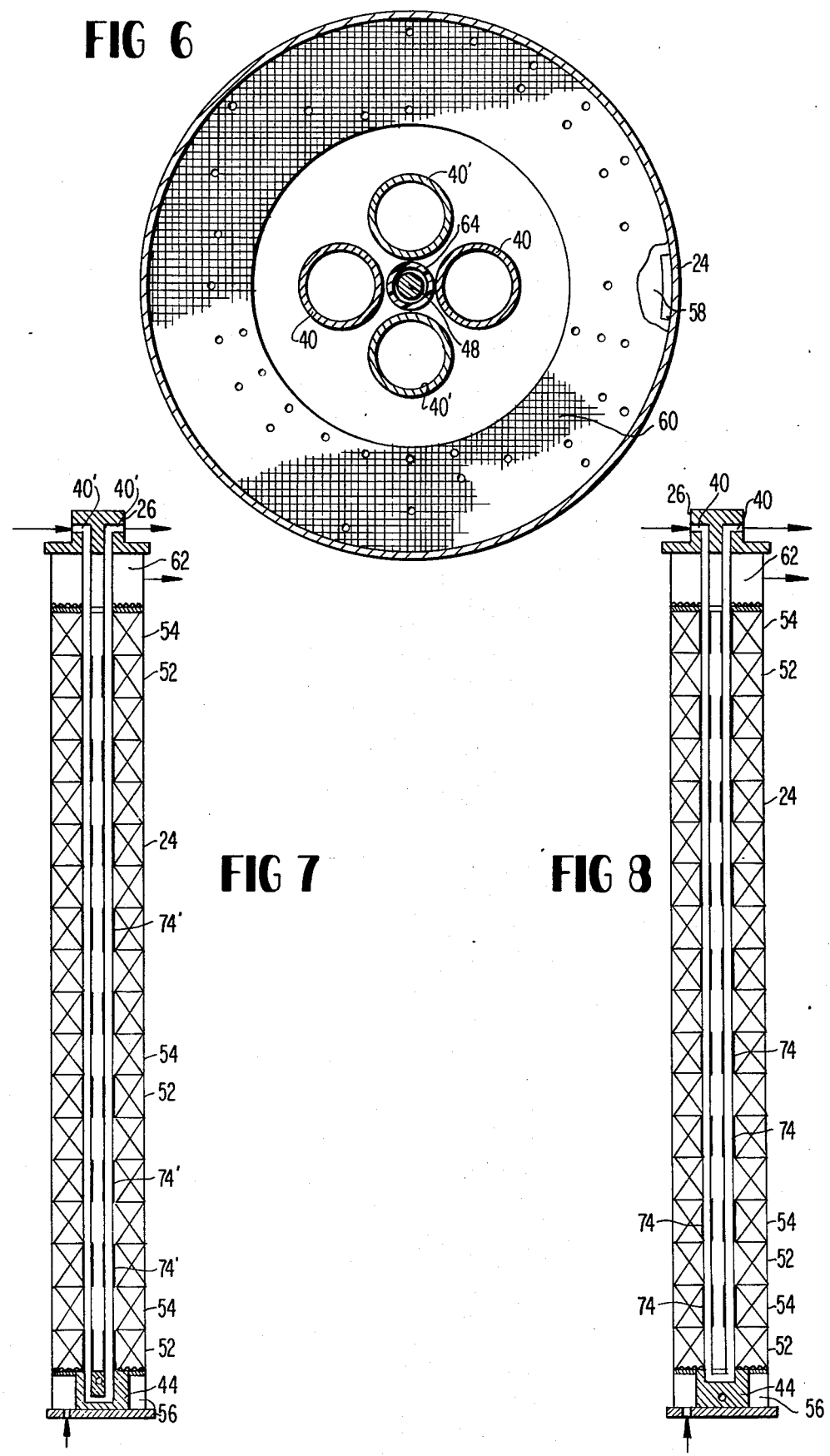

APPARATUS FOR REMOVAL OF CONTAMINANTS FROM WATER

This application is a continuation-in-part of my co-pending U.S. patent application entitled PROCESS AND APPARATUS FOR REMOVAL OF CONTAMINANTS FROM WATER, Ser. No. 573,577, filed Apr. 30, 1975.

This application relates to an improved apparatus for removing difficultly oxidizable or reducible contaminants from an aqueous solution or dispersion thereof according to the process described in said parent patent application and, therefore, the disclosure of said parent application Ser. No. 573,577, filed Apr. 30, 1975, is hereby incorporated by reference.

The aforementioned parent application discloses a process for removing contaminants from water by subjecting an aqueous solution or dispersion containing the contaminants to alternating current as said solution or dispersion passes through a bed of particles. In one embodiment there was disclosed the use of "hard" and/or "soft" packed beds wherein the solution or dispersion is subjected to an alternating current field at electrodes located in the beds as it passes therethrough. The electrodes located in the beds as it passes therethrough. The terms "hard" and "soft" beds relate in general to the resistivity or electrical conductivity thereof, and will be described in detail subsequently.

The contaminants, as described in an embodiment in said parent application pass through a "hard" bed and subsequently through a "soft" bed, or through a plurality of alternating "hard" and "soft" beds. The contaminants are initially excited or at least partially decomposed in the "hard" bed and then oxidized in the "soft" bed by hydrogen peroxide generated through alternating current electrolysis of water. This invention contemplates a series of alternating "hard" and "soft" beds stacked in a single vessel so that the liquid containing contaminants pass through said beds as the liquid passes through the vessel. The efficiency of the process of this invention has been found to improve as the number of said beds through which the contaminants pass increases.

In addition, the electrical requirements consistent with current efficiency for the "hard" beds differ from those for the "soft" beds. In the "hard" bed where resistivity is high, oxidation or reduction efficiency depends on high voltage and low current. In contrast in the "soft" bed, where resistivity is substantially lower, high current and low voltage are desired to generate hydrogen peroxide efficiently. This invention contemplates achieving current efficiency by utilizing separate electrodes for the "hard" and "soft" beds within the vessel to develope optimum current efficiency with a given power source.

The oxidization reaction of the process of this invention has often been observed to be exothermic, and will proceed much more efficiently at lower process temperatures. For example, while aqueous solutions have been treated at about 20° C. to in excess of 60° C., it has been found that the efficiency of the process of this invention diminishes as the temperature is raised, and a preferred area of operation is in the range of 20°–60° C., and most preferably from 20°–35° C. Therefore, in order to maintain the desired process temperature, the vessel of this invention is jacketed for the circulation of cooling water, and hollow electrodes are utilized so that cooling water may be circulated therethrough.

Finally, in a preferred embodiment of this invention two sets of electrodes pass through the stacked "hard" and "soft" beds within the vessel with each set of electrodes insulated at the appropriate alternating levels. In this way, then, the optimum potential may be applied at each of the alternating "hard" and "soft" beds. Each electrode then in the preferred embodiment of this invention is a hollow conduit for cooling water with insulation at the desired alternating levels so that each "hard" bed will be subjected to the same voltage and current, and each "soft" bed will be subjected to a current and voltage different from that applied across the "hard" beds.

As described in the aforementioned parent application, it is important to have catalyst containing particles between the electrodes, in both beds. The catalyst may be either an oxidation catalyst or a reduction catalyst depending upon the contaminants to be removed.

For reactions which are primarily oxidations, such as conversion of phenol to carbon dioxide and water, the oxidizing catalyst is a metal oxide wherein the metal may be any of groups IV$a$, V$a$, VI$b$, and VII$b$. Mixtures of such oxides and sequential treatment with them may also be employed. The metals of the groups mentioned include germanium, tin, lead, antimony, bismuth, chromium, molybdenum, tugsten, manganese, technetium and rhenium. The oxides of lead, bismuth, chromium and manganese are preferred, with chromium and manganese oxides being most preferred.

For reactions which are primarily reductions, the catalyst may be an oxide of any group VIII metal. The preferred reduction catalysts are the oxides of nickel and iron.

While the oxides may be employed in particular form, without being coated onto or incorporated in carriers, it is much preferred that they be used as coatings on carrier particles. The carrier particles may be conductive, semi-conductive, or non-conductive but generally it is preferred to utilize non-conductive bases. Such bases may be of various shapes, porosities and structures, but for the practice of this invention it has been found best to utilize alumina spheres. The sizes (diameters or equivalent diameters) of the alumina spheres or other base particles coated with the catalyst are normally in the range of 250 microns to 1 centimeter, preferably 0.3 to 4 mm, more preferably from about 1 to 4 mm. A mixture of sizes to fill void spaces may be utilized.

In addition to alumina bases for the catalyst coating, various other materials may also be employed, including graphite, amorphous carbon, synthetic organic polymers such as nylons, polyurethane foams, and polyacetal resins, ceramics, such as porcelain, perlite, and other glasses. The coating of catalyst on such beads or particles will normally be such that the catalyst coated particles contain up to 90 percent by weight of the catalyst.

The thickness of such coatings can be monomolecular but is usually from 10 microns to 2 mm, preferably from 100 microns to 500 microns. The various catalytic coatings of the types described may be applied to suitable carrier particles by pyrolysis techniques, such as by vacuum impregnation of porous alumina spheres with a 10 to 50 percent, e.g., 25 percent metal nitrate or other soluble salt solution wherein the metal is that of the desired metal oxide catalyst, followed by pyrolysis of the metal salt above its decomposition and at a temperature sufficient to form the desired oxide, e.g., about 230°

C. for Mn(NO$_3$)$_2$ to form MnO$_2$. By such pyrolysis method, some of the coating may be in the interior of the porous particles but the weight thereof is still considered in calculating the proportion of metal oxide coating present on the particles. When the base material is unstable to pyrolysis conditions, the catalyst may be sputtered onto the substrate, vacuum deposited or cemented or may be otherwise mechanically held thereto as by being forced into surface voids, or may be held by a fused surface portion of the substrate.

The "soft" bed includes the metal oxide coated particles present in the "hard" bed, and in addition absorptive and/or conductive particles such as those of activated carbon and/or graphite. Graphite particles improve the conductivity of the packed bed and thereby increase the electrolytic effect and oxidation of the oxidizable contaminants. In effect, they help to form a plurality of mini-cells in the bed between the electrodes. Activated carbon also helps to remove some impurities from the contaminated medium and often allows selective adsorption and desorption of such impurities, in addition to oxidation or other reactions thereof (including reduction) effected in the bed. Instead of activated carbon and graphite other absorbent and conductive particulate materials may be utilized. Particle sizes of the conductive materials (including activated carbon) may be about the same as those of the catalyst containing particles. Usually ranges are from 250 microns to 1 centimeter, preferably about 0.7 to 4 mm in diameter.

The proportion of metal oxide catalyst particles to other particles present in the "soft" bed including absorbent particles and those of greater conductivity may be by volume of 5 to 95 percent, preferably 20 to 80 percent, and most preferably 30 to 70 percent of the oxide coated particles, with the balance being the conductive and/or absorbent particles.

Therefore, the "hard" bed will contain 100 percent metal oxide coated particles, and the "soft" bed will contain, for example, 25 to 75 percent of such catalyst particles and 75 to 25 percent of activated carbon, graphite, or charcoal. In embodiments of the invention then, wherein both catalyst coated materials, activated charcoal, and graphite are used, about 20 to 80 percent of the metal oxide catalyst coated material is used with about 10 to 40 percent of activated charcoal or activated carbon and about 10 to 40 percent of graphite, by volume, with more preferably ranges of from 30 to 70 percent, 15 to 35 percent, and 15 to 35 percent, respectively.

Normally, in the packed beds of this invention the particles will occupy from 5 to 95 percent of the volume, preferably 10 to 90 percent thereof, more preferably 50 to 83 percent thereof based on a 1:1 to 5:1 ratio range of particle volume to free space. Most preferably from 67 to 83 percent (2:1 to 5:1) of the volume will be occupied with the balance being void or free space which are capable of being occupied by aqueous medium. For example, using 50 percent of the MnO$_2$ coated alumina 25 percent graphite and 25 percent activated carbon particles, the proportions thereof are 2:1:1 and the particles occupy about 75 percent of the bed volume, exclusive of electrodes. Thus, the voids total about one third of the sum of particle volume in the "soft" bed.

The depth of each of the "hard" and "soft" bed layers in the vessel of this invention may be from 2 to at least 8 inches with a bed depth of about 4 inches for each layer preferred. It should be noted, however, that the bed depth for each layer as well as the number of layers of alternating "hard" and "soft" beds utilized in a single vessel as described herein is not intended to limit the scope of this invention, but is merely descriptive of a preferred embodiment thereof. The operating conditions as described in the parent application are generally applicable hereto, as will be subsequently illustrated.

The alternating current employed may be of any suitable wave shape, including sine, square wave, modified sine and other wave forms, but it is usually important to have a balanced wave form; one in which the current flow in one direction is equal to that in the other. Thus, an alternating current superimposed on a direct current will usually be unacceptable. The frequency of the alternating current should be in the range of 0.5 to 800 Hz., preferably from 10 to 400 Hz. and most preferably from 25 to 200 Hz. AC at 50 or 60 Hz is satisfactory and is more readily available. The voltage will be from 1.67 to 150 volts. The lower limit 1.67 volts is the decomposition voltage of water and the higher limit is a function of the conductivity of the particle bed and electrolyte (including the percentage of conductive particles present). The current density will be in the range of 0.1 to 30 amperes per square centimeter, preferably 0.5 to 1.5 or 2 amperes per square centimeter. The operating temperature will be from 5° to 95° C., preferably from 20° to 60° C., and more preferably from about room temperature, e.g., 20° to 35° C.

Accordingly, it is an object of this invention to provide an improved apparatus for removing contaminants from water.

It is another object to provide a highly efficient means for oxidizing or reducing contaminants from aqueous solutions or dispersions through the use of alternating current electrolysis to produce hydrogen peroxide.

It is yet another object to provide a vessel containing alternating layers of insulating and conducting packed beds whereby alternating current applied across electrodes in each of said beds will sequentially decompose said contaminants and oxidize or reduce said contaminants.

It is still a further object to provide a vessel utilizing water cooled electrodes extending through multiple layers of alternating insulating and conductive particle beds whereby an aqueous solution or dispersion passed through said beds and subjected to said electrical conditions of voltage and current for efficient breakdown and oxidization of said contaminants.

These and other objects will become readily apparent with reference to the drawings and following description wherein:

FIG. 4 is a longitudinal sectional view of the vessel of this invention having the center portion removed;

FIG. 5 is a sectional view taken along line 5—5 of FIG. 4;

FIG. 6 is a sectional view taken along line 6—6 of FIG. 4;

FIG. 7 is a schematic, longitudinal view of the vessel of this invention; and

FIG. 8 is a longitudinal, sectional view taken at a 90° angle to FIG. 7 of the vessel of this invention.

Figure 1:
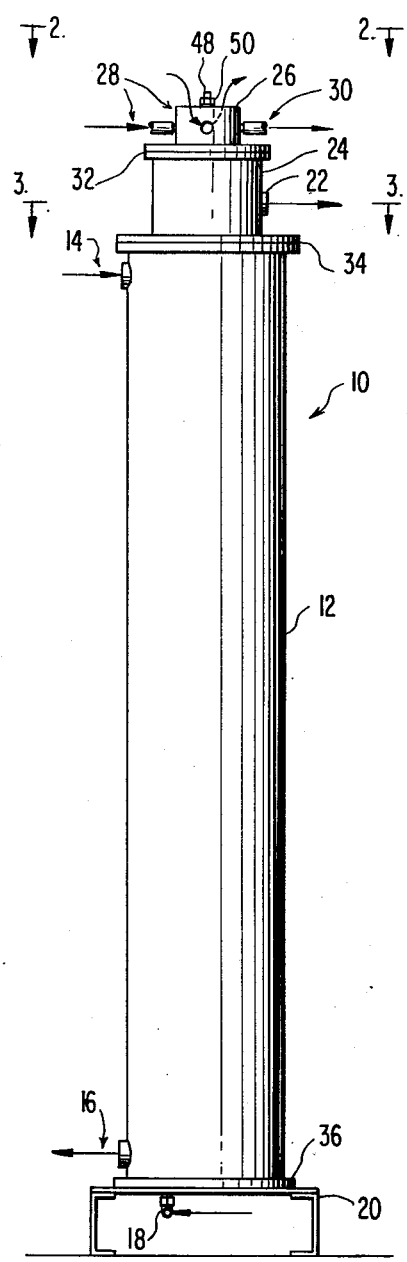
FIG. 1 is a schematic plan view of the vessel of this invention.

With attention to the drawings, FIG. 1 depicts a vessel 10 constructed according to the principles of this invention for removing contaminants from an aqueous solution. Vessel 10 preferably is surrounded at least along a substantial portion of the height thereof by a water jacket 12 having an inlet 14 and an outlet 16 for cooling water which preferably is circulated during operation thereof.

The lower portion of vessel 10 includes an inlet 18 in the base 20 for admitting the aqueous solution to be processed, and an outlet 22 in the upper portion of the cell casing 24. A top cover 26 includes inlets 28 and outlets 30 for electrode cooling water, as will be subsequently described.

The top cover 26 is secured to the upper portion of the cell casing 24 by suitable mounting flanges and gaskets 32 to provide a water tight fit, and the jacket 12 is also secured to the casing by an upper mounting flange 34 and to the base 20 by a lower mounting flange 36.

The apparatus may be of any suitable known material resistant to the action of the electrolyte and the electrolytic currents. Suitable materials include glass, stainless steel, steel, carbon, especially graphite, polyethylene, polypropylene, polyvinyl chloride, after-chlorinated polyvinyl chloride, polyvinylidene floride, bitumin, porcelain, fiber glass reinforced polyester and rubber, especially neoprene. The container may be entirely of such materials or may be faced with them as is desired.

As will be obvious to those skilled in the art, the apparatus of this invention may be of any convenient shape or orientation, and the material to be processed may be admitted to the cell at either end. However, it is preferred to admit the aqueous solution containing contaminants at the bottom of the cell in order to maintain uniform flow through the cell without channelling or the like.

With attention to FIG. 4, the apparatus of this invention mounts electrodes internally to casing 24. Electrodes 40 are preferably mounted in top cover 26 by O-ring seals 42 and in base cover 44 at similar O-ring seals.

Electrodes 40 are preferably hollow the permit the flow of cooling water therethrough. In the preferred embodiment of this invention, the twin electrodes form a U-shaped channel for the flow of water. Water is then admitted at inlet 28, and travels through a first electrode 40, channel 46 in base 44, and exits the apparatus through a second electrode 40 and outlet 30.

In order to maximize current efficiency, as will be subsequently explained, four electrodes are utilized, and the longitudinal axis thereof lie at 90° angles in the horizontal plane.

With attention to FIG. 5, an alternate channel 46' is located in base 44 connecting opposed electrodes 40' to permit the flow of cooling water therethrough. Said electrodes, as shown in FIG. 1, receive cooling water through an inlet in top cover 26 in the above described manner.

The apparatus is assembled by utilizing a central rod 48 which at a lower end is threadedly received in base 44, and passes through top cover 26 where a conventional securing means 50 may be utilized.

Casing 24 contains alternate "hard" and "soft" beds 52 and 54, respectively. The beds may be of any preferred depth, such as 2 to 8 inches and are stacked in an abutting relationship as shown. As described above, the "hard" bed comprises catalyst coated particles only, and the "soft" bed comprises catalyst coated particles and conductive particles such as graphite.

The aqueous solution containing contaminants is admitted through inlet 18 to an inlet chamber 56 below the first "hard" bed. Chamber 56 is separated from the packed bed by a baffle plate 58 which has a screen 60 disposed thereon. See FIG. 6.

Figure 3:
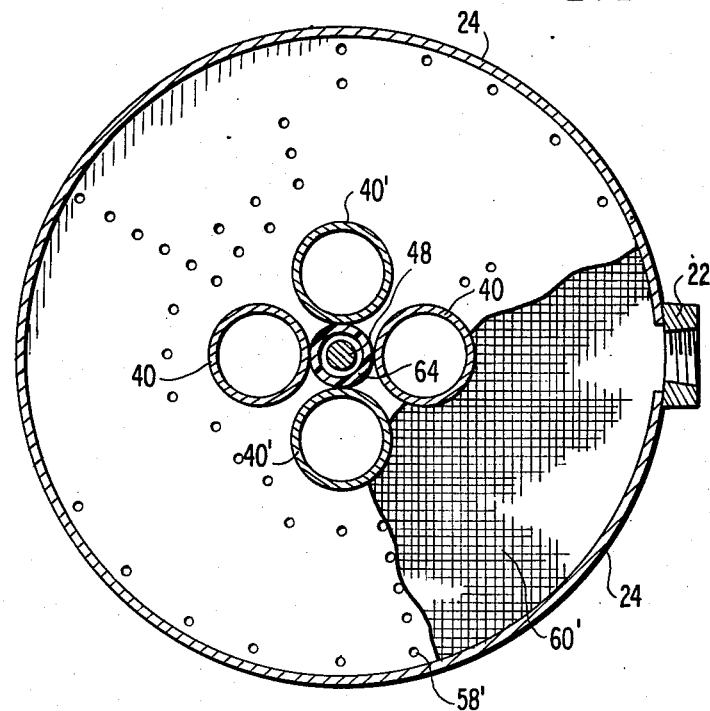
FIG. 3 is a view taken along lines 3—3 of FIG. 1 with a portion thereof partially broken away.

With attention to FIG. 3, a similar baffle plate 58' with a screen there below 60' is disposed above the uppermost bed within casing 24. Plate 58' and screen 60' separate the upper bed from an outlet chamber 62 disposed within the uppermost portion of casing 24, and chamber 62, as shown in FIG. 4, is in communication with outlet 22.

Figure 2:
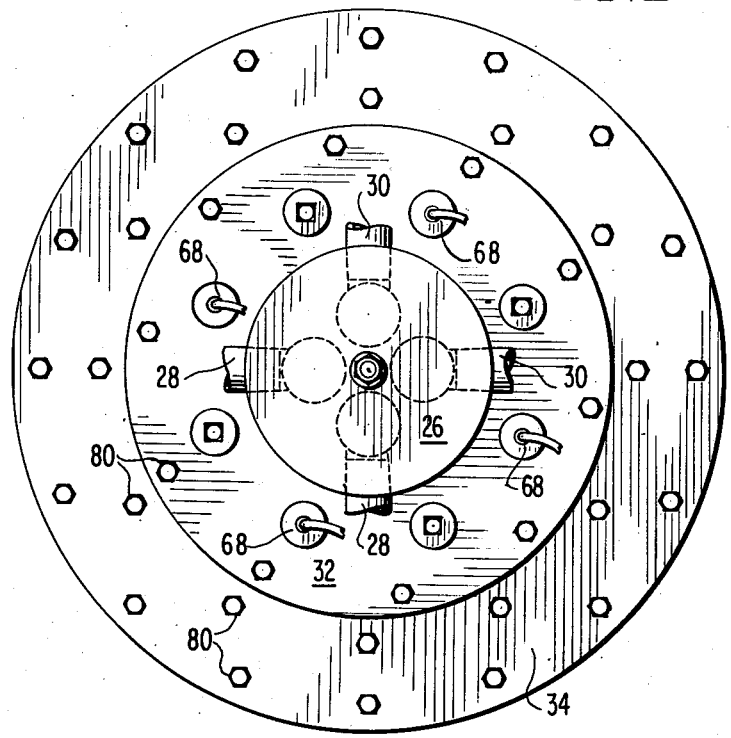
FIG. 2 is a view taken along lines 2—2 of FIG. 1.

Preferably, the portion of rod 48 extending through the packed beds is surrounded with an insulating sleeve 64. A source of power is coupled to electrodes 40 and 40' by a cable 66 which extends through ceiling plugs 68 in top cover 32. See FIG. 2. Cable 66 may be coupled to electrodes 40 or 40' by any conventional means such as a ring clamp 70.

With attention to FIGS. 7 and 8, the schematic depicted at these figures represents a vertical plane passing through the device of this invention, in each instance, however, said planes are disposed at 90° angles to each other. In order to apply an equal voltage at each "hard" bed and an equal but different voltage and current at each "soft" bed electrodes 40 and 40' are utilized. As shown in FIG. 8, electrodes 40 are insulated at each "soft" bed 54 by any conventional insulation wrapping 74. Therefore, the voltage and current coupled to electrode 40 will be applied only in the "hard" beds 52 within casing 24. With attention to FIG. 7, electrodes 40' are insulated by any conventional insulating wrapping 74', at each "hard" bed so that electrodes 40' apply a voltage and current desired in each "soft" and 54. Because each "hard" bed 52 contains the catalyst coated packing only, said bed will have a high resistivity and a low conductivity, and accordingly, a high voltage and low current will be desired at electrode 40. In contrast, the "soft" bed 54 containing conductive particles in addition to catalyst coated packing will have a lower resistivity, and in order to generate the maximum of hydrogen peroxide for oxidation (or reduction) a high current and low voltage at electrode 40' will be desired. By utilizing electrodes 40 and 40', current efficiency may be improved. If the identical current and voltage were applied in both the "hard" bed 52 and the "soft" bed 54, as is obvious to those skilled in the art, the efficiency of the process will be much lower. If desired, however, only two electrodes may be utilized within the scope of this invention. Most preferably, however, separate electrodes for each different bed will be used.

In addition, the number of pairs of beds 52 and 54 will also govern the efficiency of the process of this invention. If desired, two, four, or six beds may be utilized. However, in the preferred embodiment of this invention a bed depth of 4 inches is utilized, and 18 beds or nine pairs of beds. This invention is not intended to be limited to a specific number of beds, or as noted above a specific bed depth. Any desired number or depth may be utilized within the scope of this invention.

This invention is also not intended to be limited to the shape of the apparatus 10 or the means utilized for assembly. In the preferred embodiment, however, flanges and mounting rings 32, 34, and 36 are utilized with appropriate bolts 80 for assembly as shown. Obviously any conventional means for attaching the components of the apparatus of this invention may be utilized. As also will be obvious to those skilled in the art, when mounting flanges and rings are utilized, the appropriate gaskets 82 will also be utilized in order to assure water tight fittings. For this reason, O-rings 42 are also provided at the connection of electrodes 40 and 40' with the top cover 26 and the bottom 44.

The electrodes may be constructed of any suitable material known to be useful including stainless steel, steels of various types, titanium coated with ruthenium dioxide, titanium coated with manganese dioxide, titanium coated with platinum, amorphous carbon and platinum, or the like, but preferably the electrodes are constructed of graphite.

Any conventional source of alternating current may be coupled to electrodes 40 and 40' by cables 66. While direct connection to a supply source 50 Hz. or 60 Hz. AC will usually be made, it is preferred if means are included in the apparatus for varying the frequency of the alternating current within ranges described herein, 0.5 to 800 Hz. and 10 to 400 Hz. When such wide range variation is not available, variation within a more preferred range, 25 to 200 Hz., will be useful.

The following are examples of utilization of the apparatus of this invention and are included herewith as illustrative and not to be considered a limitation of this invention.

EXAMPLE I

COKE OVEN EFFLUENT

A device constructed according to this invention was utilized to process coke oven effluent. The device had 18 alternating "hard" and "soft" beds. Each bed was 4 inches deep. Cylindrical graphite electrodes were utilized. The "hard" bed consisted of manganese dioxide coated alumina spheres, and the "soft" bed included the catalyst packing materials and graphite pellets. The effluent to be processed had the following contaminants: 200 ppm phenol; 2400 ppm COD; and 13 ppm cyanide. Total solids content was 4270 ppm with 19 ppm suspended solids. The transmittance as measured with a spectro-photometer, 470 mu, was 59.3 percent as measured against the transmittance of distilled water which was set at 100 percent. The flow rate was 1 gallon per minute with a residence time of about 3 minutes. The "hard" bed electrodes carried 29 volts and 39 amps current, and the "soft" bed electrodes carried 13.7 volts and 120 amps current.

After approximately 1 hour of running time samples of the effluent were analyzed and 100 percent of the phenol and cyanide were found to have been removed. 99.8 percent of COD was removed, and the transmittance was measured at 99 percent.

EXAMPLE II

PINK WATER/TNT

The same device of this invention was utilized to process pink water which was found to initially have a COD of 303 with a transmittance of 52.8 percent. The flow rate was 1 gallon per minute, and the "hard" bed electrodes carried 29 volts, 12 amps. The "soft" bed electrodes carried 9 volts and 45 amps.

After one pass through the device all nitro bodies were removed, the COD was reduced to 52, the effluent was colorless, and the transmittance was measured at 95.2 percent. After a second pass through the device, the COD was reduced to 8 and the transmittance was evaluated at 100 percent.

EXAMPLE III

POLYCHLORINATED BIPHENYL (PCB)

The following example illustrates utilization of the device of this invention as described above with relation to Examples I and II was utilized to eliminate PCBs contamination from an aqueous solution. The initial feed to the device of this invention had a PCB content of 120 parts per billion (PPB). A flow through the device of 1 gallon per minute was utilized, and the "hard" bed electrodes carried 29 volts, 12 amps. The "soft" bed electrodes carried 10 volts and 15 amps current.

After completion of the run, the PCB content was measured at 1.5 PPB.

In summary then the device of this invention by utilizing alternating packed "hard" and "soft" beds has been found to be an excellent means for eliminating difficultly oxidizable or reducible in purities from dilute aqueous solutions or dispersions. While the device could be utilized with inert packing in the "hard" bed rather than catalyst coated packing, vastly improved results have been found with the catalyst. The combination of stacked "hard" and "soft" beds with water cooled electrodes in each has also been found to achieve vastly improved results.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. An apparatus for the removal of contaminants from aqueous media comprising:
    a container having an inlet for admitting said media and an outlet for expelling purified water;
    at least one pair of first and second packed beds of particles disposed in said container, said first bed consisting of particles coated with a non-conducting, metal oxide selected from the group consisting of oxides of metals of any of Groups IV$a$, V$a$, VI$b$, and VII$b$ and VIII and mixtures thereof, said second bed comprising said metal oxide coated particles and conductive particles said second bed being disposed adjacent said first bed;
    first and second pairs of electrodes, disposed, said first pair at least in said first bed, and said second pair at least in said second bed; means coupled to each pair of electrodes for applying alternating current having a frequency of 0.5 to 800 Hz thereto;
    means for directing contaminated aqueous media through said inlet and sequentially through each of said beds so that the contaminants therein are subjected to an alternating current electrical field in said beds to decompose and oxidize or reduce said contaminants.

2. The device of claim 1 wherein said electrodes are hollow.

3. The device of claim 2 wherein said electrodes are water cooled by a flow of water therethrough.

4. The device of claim 1 further comprising means disposed around the central portion of said container for cooling said container.

5. The device of claim 2 wherein said electrodes are graphite.

6. The device of claim 1 wherein said container is an elongated upstanding vessel and said beds are stacked therein, the inlet being disposed below said beds and the outlet above said beds.

7. The device of claim 6 wherein a plurality of alternating pairs of beds are disposed within said vessel.

8. The device of claim 7 wherein each of said beds is of a height of from 2 to 8 inches.

9. The device of claim 7 further comprising two pairs of electrodes and means carried by said electrodes for applying a first electrical potential at each of said first beds and a second at each of said second beds.

10. The device of claim 1 wherein said conductive particles are graphite.

11. The device of claim 10 wherein said coated particles are selected from the group consisting of porous glass graphite, amorphous carbon, organic polymers and ceramics coated with an oxide selected from the group consisting of $MnO_2$ and $Cr_2O_3$.

12. The device of claim 1 further comprising means for cooling the electrodes carried by said device.

13. The apparatus of claim 1, wherein the metal of Group IV$a$ is lead, the metal of Group V$a$ is bismuth, the metal of Group VI$b$ is chromium, and the metal of Group VII$b$ is manganese and the metal of Group VIII is nickel.

14. The apparatus of claim 1, wherein the particulate carrier on which the metal oxide is coated is selected from the group consisting of graphite, amorphous carbon, synthetic organic polymers, ceramics and glasses.

15. The apparatus of claim 1, wherein the particles comprising said beds range in sizes from about 250 microns to 1 centimeter and the metal oxide coated particles contain from up to 90% by weight of the metal oxide.

16. The apparatus of claim 15, wherein the particles in said second bed comprise 5 to 95% metal oxide coated particles and 95 to 5% conductive particles, by volume, and said first bed of metal oxide coated particles is from about 50 to 83% of said particles and about 50 to 17% of free space about said particles, by volume, which free space is capable of being occupied by the aqueous medium.

17. An apparatus according to claim 16, wherein the second bed comprises about 25 to 75% metal oxide coated particles and about 75 to 25% conductive particles.

18. The apparatus according to claim 16, wherein said second bed comprises from about 20 to 80% of the metal oxide coated particles, about 10 to 40% activated charcoal, and about 10 to 40% graphite, by volume.

19. The apparatus according to claim 15, wherein the metal oxide coated particles in said beds are in the range of 0.3 to 4 mm in diameter and the proportion of the total of the volumes of the particles to the free space between them in said beds is in the range of 1:1 to 5:1.

20. The apparatus of claim 17, wherein the metal oxide coated particles in said beds are in the range of 0.3 to 4 mm and the proportion of the total of the volumes of the particles to the free space between them in said beds is in the range of about 1:1 to 5:1.

21. The apparatus of claim 1, wherein the electrodes are of a material or materials selected from the group consisting of stainless steel, graphite, titanium coated with ruthenium dioxide, titanium coated with manganese dioxide, amorphous carbon and platinum and the ratio of the volume of the particles to the free space between them in said beds is in the range of 2:1 to 5:1.

22. The apparatus of claim 21, wherein the electrodes are hollow graphite rods, the metal oxide coated particles are substantially spherical in shape and of diameters in the range of from about 0.3 to 4 mm, the voids between the particles are about ⅓ of the total volume of the particles and the source of alternating current communicated to the electrodes is of a frequency of from 10 to 400 Hz.

23. The apparatus of claim 9, wherein said means for applying a first electrical potential at each of said first beds and a second at each of said second beds includes means for applying a higher voltage and lower current across said first electrodes in said first beds than across said second electrodes and said second beds.

* * * * *